US010491412B2

(12) United States Patent
Chaudhuri et al.

(10) Patent No.: US 10,491,412 B2
(45) Date of Patent: Nov. 26, 2019

(54) SYSTEM AND A METHOD FOR MULTIMULTIMEDIA BROADCAST AND MULTICAST SERVICES

(71) Applicant: Wipro Limited, Bangalore (IN)

(72) Inventors: Saptarshi Chaudhuri, Bangalore (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 143 days.

(21) Appl. No.: 15/270,289

(22) Filed: Sep. 20, 2016

(65) Prior Publication Data

US 2018/0034651 A1    Feb. 1, 2018

(30) Foreign Application Priority Data

Jul. 30, 2016    (IN) .............................. 201641026135

(51) Int. Cl.
     *H04L 12/18*      (2006.01)
     *H04W 72/00*      (2009.01)

(52) U.S. Cl.
     CPC ............ *H04L 12/189* (2013.01); *H04L 12/18* (2013.01); *H04L 12/185* (2013.01); *H04W 72/005* (2013.01); *H04L 12/1859* (2013.01)

(58) Field of Classification Search
     CPC . H04L 12/189; H04L 12/185; H04L 12/1859; H04L 12/18; H04L 12/184; H04L 12/1845; H04L 29/06455; H04L 29/08693; H04L 29/12292; H04L 47/15; H04L 47/806; H04L 49/201; H04L 49/203; H04L 61/2069; H04W 72/005; H04J 2203/0019
     USPC ........................................................ 370/312
See application file for complete search history.

(56) References Cited

U.S. PATENT DOCUMENTS

| | | | |
|---|---|---|---|
| 6,826,612 B1 * | 11/2004 | Bosloy | H04L 12/1863 709/226 |
| 9,106,430 B1 * | 8/2015 | Zhou | H04N 21/26616 |
| 9,686,770 B2 * | 6/2017 | Hsu | H04W 72/005 |
| 2002/0194361 A1 * | 12/2002 | Itoh | H04L 1/0002 709/233 |
| 2006/0029078 A1 * | 2/2006 | Lu | H04L 12/185 370/395.2 |

(Continued)

FOREIGN PATENT DOCUMENTS

EP      2600642 A1      5/2013

OTHER PUBLICATIONS

Macker et al., "A TCP Friendly, Rate-Based Mechanism for Nack-Oriented Reliable Multicast Congestion Control," Global Telecommunications Conference, Globecom '01. IEEE, 2001, pp. 1620-1625 (Year: 2001).*

(Continued)

*Primary Examiner* — Un C Cho
*Assistant Examiner* — Lalita W Pace
(74) *Attorney, Agent, or Firm* — Pepper Hamilton LLP

(57) ABSTRACT

A system and a method for multimedia broadcast and multicast services is disclosed. The method comprises determining, by a multimedia services computing device, at least one of type of multimedia services and number of multimedia services subscribed by each UE of a plurality of UEs. The method further comprises, creating by the multimedia services system, one or more multicast groups of UEs based on a similarity between the at least one of type of multimedia services and the number of multimedia services subscribed by the each UE. Based on the one or more multicast groups the multimedia messages may be multicast or broadcast.

20 Claims, 6 Drawing Sheets

(56) References Cited

U.S. PATENT DOCUMENTS

| | | | | |
|---|---|---|---|---|
| 2006/0094408 A1* | 5/2006 | Hu | ............... | H04L 12/185 |
| | | | | 455/414.1 |
| 2006/0268697 A1* | 11/2006 | Oz | ............... | H04L 12/1836 |
| | | | | 370/229 |
| 2010/0159822 A1 | 6/2010 | Lim et al. | | |
| 2011/0310785 A1 | 12/2011 | Gou et al. | | |
| 2012/0236776 A1* | 9/2012 | Zhang | ............... | H04W 48/12 |
| | | | | 370/312 |
| 2013/0138807 A1* | 5/2013 | Perkuhn | ............... | H04W 28/26 |
| | | | | 709/224 |
| 2014/0376376 A1* | 12/2014 | Bejerano | ............... | H04L 47/263 |
| | | | | 370/235 |
| 2016/0043962 A1* | 2/2016 | Kim | ............... | H04L 67/02 |
| | | | | 709/224 |
| 2016/0057732 A1* | 2/2016 | Li | ............... | H04W 24/02 |
| | | | | 370/331 |
| 2016/0315876 A1* | 10/2016 | Sinha | ............... | H04L 47/828 |
| 2017/0063563 A1* | 3/2017 | Saikun | ............... | H04L 47/25 |
| 2017/0134180 A1* | 5/2017 | Gigliarelli | ............... | H04L 12/185 |

OTHER PUBLICATIONS

Holland et al., "Dynamic Switching between One-to-Many Download Methods in "All-IP" Cellular Networks," IEEE Transactions On Mobile Computing, vol. 5, Mar. 2006, pp. 274-287 (Year: 2006).*

Tan et al., "Adaptive Multicast Scheme for OFDMA-based Multicast Wireless Systems," Electronics Letters, vol. 47, Issue 9, Apr. 28, 2011, pp. 570-572 (Year: 2011).*

* cited by examiner

SYSTEM AND A METHOD FOR MULTIMULTIMEDIA BROADCAST AND MULTICAST SERVICES

This application claims the benefit of Indian Patent Application Filing No. 201641026135, filed Jul. 30, 2016, which is hereby incorporated by reference in its entirety.

FIELD

This disclosure relates generally to multicast and broadcast of multimedia services, and more particularly to a system and a method for multimedia broadcast and multicast services.

BACKGROUND

Different mobile applications may provide various multimedia services such as video conferencing, television broadcast, video on-demand, multi-player gaming, etc on User Equipment (UEs). Some of these applications may provide the same content to a number of application subscribers. For example, if a live sporting event is to be transmitted over a video-on-demand application, the same content may be transmitted to a large number of subscribers who have subscribed to watch the live sporting event. Similarly, there may be other occasions during which the same content may be viewed by a number of subscribers.

Usually such transmission of duplicate content may lead to sub-optimal use of network resources. In case the number of subscribers and simultaneous service consumption increases, network-resource-demand may exceed the available network capacity. This is likely to choke the network affecting service quality of individual or group of users. In order to use network resources effectively in such a scenario, $3^{rd}$ Generation Partnership Program (3GPP) proposes Multicast Broadcast Multimedia Services (MBMS) service mechanism for transmitting same data from one data source (eNB) to several relevant target UEs. MBMS may Multicast services as well as Broadcast services for transmitting data to various users.

However, the 3GPP MBMS specification fails to provide mechanism to identify relevant group of MBMS users based on service and content for effective radio resource use.

SUMMARY

In one embodiment, a method of creating a multicast group is disclosed. The method comprises determining, by a multimedia services system, at least one of type of multimedia services and number of multimedia services subscribed by each UE of a plurality of UEs. The method further comprises, creating by the multimedia services system, one or more multicast groups of UEs based on a similarity between the at least one of type of multimedia services and the number of multimedia services subscribed by the each UE.

In another embodiment, a system for creating a multicast group is disclosed. The system comprises: a processor; and a memory disposed in communication with the processor and storing processor-executable instructions, the instructions include: determine at least one of type of multimedia services and number of multimedia services subscribed by each UE of a plurality of UEs. The instructions further comprising instructions to create one or more multicast groups of UEs based on a similarity between the at least one of type of multimedia services and the number of multimedia services subscribed by the each UE.

In another embodiment, a non-transitory computer-readable storage medium for creating a multicast group is disclosed, which when executed by a computing device, cause the computing device to perform operations including, determining at least one of type of multimedia services and number of multimedia services subscribed by each UE of a plurality of UEs. The operations further include instructions to create one or more multicast groups of UEs based on a similarity between the at least one of type of multimedia services and the number of multimedia services subscribed by the each UE.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
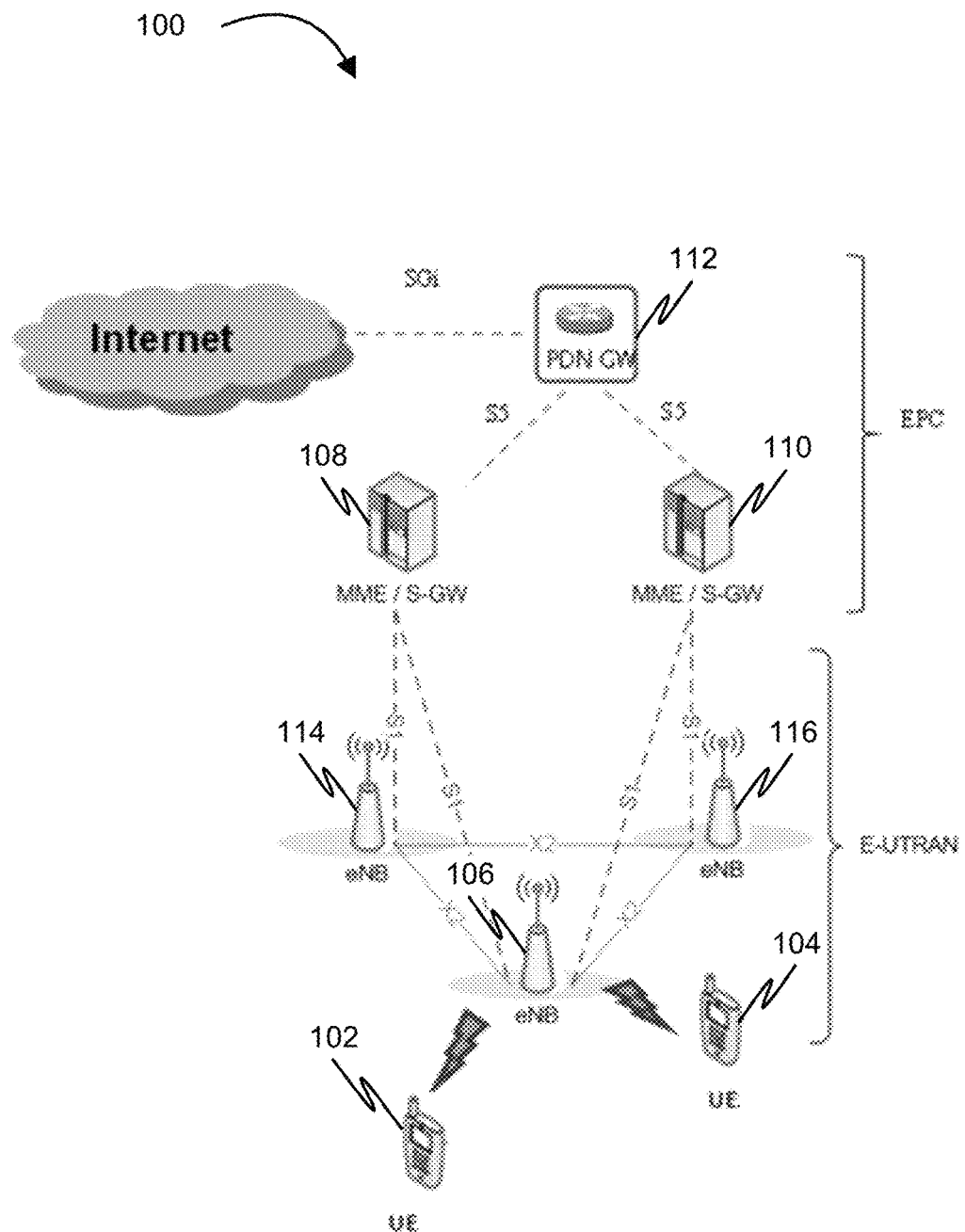
FIG. 1 illustrates an exemplary broadband wireless network architecture in which various embodiments of the present disclosure may function.

An exemplary high level network 100 depicting a broadband wireless network architecture is illustrated in FIG. 1. For purposes of illustration, the network 100 corresponds to an LTE network. However, the depicted LTE network is merely an exemplary network, and thus it will be understood that the teachings of the disclosure contemplate other broadband wireless networks such as WiMax, High Speed Packet Access (3GPP's HSPA), etc.

In FIG. 1, one or more user equipment (UE) such as UE 102 and UE 104 may communicate wirelessly with an eNB 106 that is an LTE base station. In this case, eNB 106 acts as the serving eNB for both UE 102 and UE 104. The functionalities of eNB 106 may include Radio Resource Management (RRM), header compression and encryption of user data stream, packet scheduling and transmission, physical layer processing, etc. An example of a UE may be a cell phone, PDA, tablet computer, etc. The eNB 106 may communicate with an evolved packet core (EPC) that may include a Mobility Management Entity (MME) associated with a serving gateway (S-GW). The MME and the S-GW are represented together in FIG. 1 as MME/S-GW 108 and MME/S-GW 110 for the sake of simplicity. However, it is to be noted that the MME and the S-GW in some embodiments may be separate and distinct entities. The MME manages and stores UE context and further generates temporary identities and allocates them to UEs. The SGW routes and forwards user data packets, while also acting as the mobility anchor for the user plane during inter-eNB handovers and as the anchor for mobility between LTE and other 3GPP technologies. Network 100 may further include a Packet Data Network Gateway (PDN GW) 112 that provides connectivity to UE 102 and UE 104 to external packet data networks by being the point of exit and entry of traffic for UE 102 and UE 104. A UE may have simultaneous connectivity with more than one PDN GW for accessing multiple PDNs. The PDN GW performs policy enforcement, packet filtering for each user, charging support, lawful Interception, etc.

In addition to the serving eNB 106, network 100 may further include neighboring eNBs such as an eNB 114 and an eNB 116. It is to be noted that, while only eNB 114 and eNB 116 are illustrated as neighbors in FIG. 1 for sake of simplicity, serving eNB 106 may have any number of neighbors.

Figure 2:
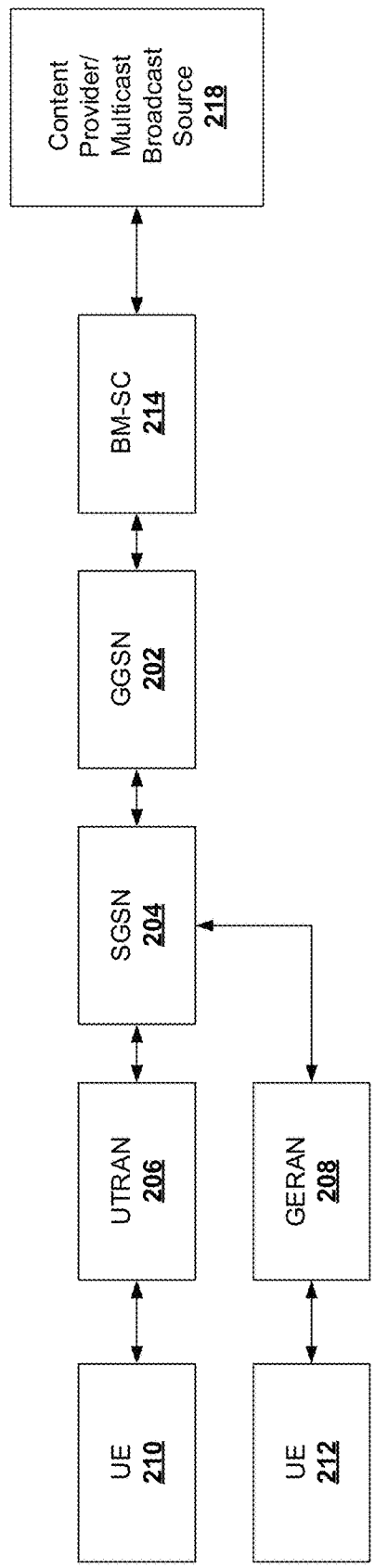
FIG. 2 illustrates an exemplary broadband wireless network architecture for MBMS service support, in which various embodiments of the present disclosure may function.

FIG. 2 illustrates an exemplary broadband wireless network architecture for Multicast Broadcast Multimedia Services (MBMS) service support, in accordance with various embodiments of the present disclosure may function. MBMS service may offer two modes, Multicast mode and broad cast mode. MBMS architecture may enable the efficient usage of radio-network and core-network resources, with an emphasis on radio interface efficiency. A network combination of Gateway General Packet Radio Service (GPRS) Support Node (GGSN) 202, Serving GPRS Support Node (SGSN) 204, Universal Terrestrial Radio Access Network (UTRAN) 206, GSM Edge Radio Access Network (GERAN) 208, UE 210 and UE 212 may provide delivery of IP Multicast datagrams. In an example, resources may be shared for delivery of multimedia data through multicast mode or broadcast mode.

In an example, Broadcast-Multicast Service Centre, interchangeably referred to as BM-SC 214 henceforth, may provide functions for MBMS user service provisioning and delivery. The BM-SC 214, may also provide membership function, session and transmission function, proxy and transport function, service announcement function and security function. In an example, the UE 210 and the UE 212 may support functions for MBMS activation and deactivation. The UE 210 may synchronize with the SGSN 204, to determine which of its MBMS contexts are still active, and may be able to receive MBMS user service announcements, paging information (non MBMS specific) and support simultaneous services. The UTRAN 206 and the GERAN 208 may be responsible for supporting the initiation and termination of MBMS transmissions by the core-network and may also receive MBMS data from the core-network shared by the UEs 210. Efficient delivery of MBMS data in multicast mode may require mechanisms in the UTRAN 206 and the GERAN 208. In an example, the UTRAN 206 and the GERAN 208 may store the number of users within a cell prior to and during MBMS transmission.

The SGSN 204 may indicate its MBMS support to the UEs 210 and may synchronize with the UE 210, to determine which of the UE's MBMS contexts are still active.

Upon notification from the BM-SC 214, the GGSN 202 may request the establishment of a bearer plane for a broadcast or multicast MBMS transmission. Further, upon BM-SC 214 notification, the GGSN 202 may tear down the established bearer plane. Bearer plane establishment for multicast services is carried out towards the SGSN 204 that have requested to receive transmissions for the specific multicast MBMS bearer service. The Content Provider/Multicast Broadcast Source 218 may deliver various multimedia services such as video conferencing services, real-time content streaming, video-on-demand, etc. The architecture is standardized by the $3^{rd}$ Generation Partnership Program (3GPP).

Figure 3:
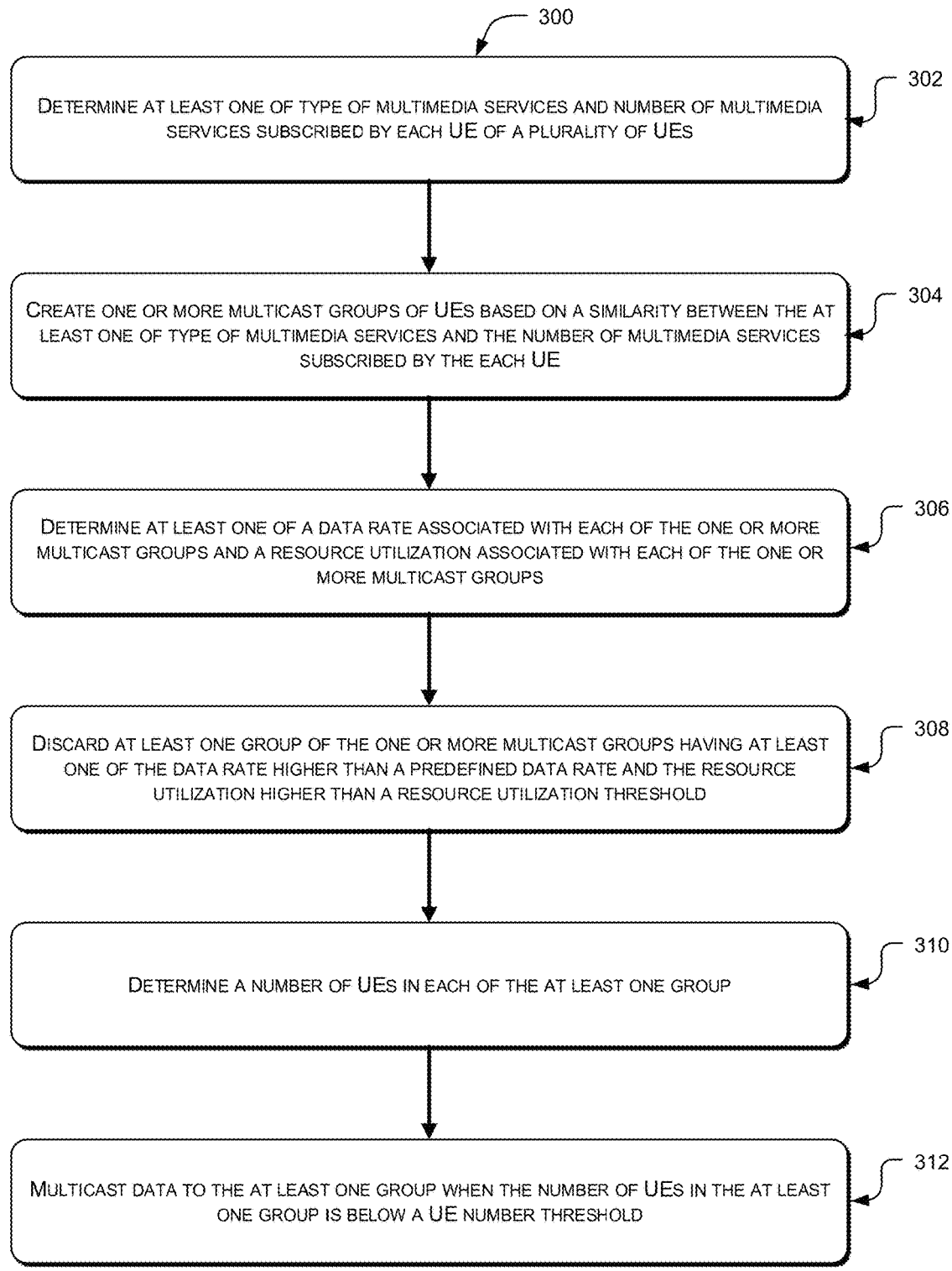
FIG. 3 is a flow diagram illustrating a method of creating a multicast group in accordance with some embodiments of the present disclosure.

FIG. 3 is a flow diagram illustrating a method of creating a multicast group in accordance with some embodiments of the present disclosure. With reference to FIG. 3, at step 302, at least one of type of multimedia services and number of multimedia services subscribed by each UE of a plurality of UEs may be determined by a Multimedia Services System (hereinafter referred as MSS). Here, the type of multimedia services may correspond to the various multimedia services consumed by the UE. The user associated with the UE may subscribe to any number of multimedia services such as video conferencing services, real-time content streaming, video-on-demand, etc. Thus, the types of multimedia services associated with a UE as well as the number of such multimedia services may be determined for each UE associated with a serving Base Station (BS).

Thereafter, at step 304, one or more multicast groups may be created based on a similarity between the at least one of type of multimedia services and the number of multimedia services subscribed by the each UE. For example, if any two UEs subscribe to the same type of multimedia services such as on-demand video streaming, then the two UEs may be grouped together. Similarly, if two UEs subscribe to substantially the same number of multimedia services, then they may be included in the same group.

In some embodiments, the number of multimedia services subscribed by the UE may be represented as $MBMS\_Service_{num}$ (i, num) where num is the number of services subscribed by the UE, and i varies from 1 to the total number of UEs and represents the $i^{th}$ UE. The UEs having the same number of multimedia services may be grouped together to form the one or more multicast groups. In equation form, it may be represented as:

$$MBMS\_Service_{num}(i, \text{num}) = MBMS\_Service_{num}(j, \text{num}).$$

(where j represents the $i^{th}$ UE and j varies from 1 to (i−1)). If the above condition is true, then the $i^{th}$ UE and the $j^{th}$ UE may be considered as probable candidates for a multicast group. In other words, the $i^{th}$ UE and the $j^{th}$ UE may be grouped together since the $i^{th}$ UE and the $j^{th}$ UE subscribe to the same number of services.

In some embodiments, the multicast groups may be created based on the type of multimedia services subscribed. The type of multimedia services for an $i^{th}$ UE may be represented as $UE\_Servicetype$ (i, service), where i represents the $i^{th}$ UE and "service" represents the at least one type of multimedia service subscribed by the $i^{th}$ UE. The UEs subscribed to the same type of multimedia services may be grouped together to form a multicast group. For example if an $i^{th}$ UE and a $i^{th}$ UE both subscribe to the same television service, then the $i^{th}$ UE and a $j^{th}$ UE may be grouped together in a multicast group.

The equation form may be:

$$UE\_Servicetype(i,service)==UE\_Servicetype(j,service)$$

If the above condition is true, then the $i^{th}$ UE and the $j^{th}$ UE may be considered as probable candidates for a multicast group.

In some further embodiments, the UEs with the same number of multimedia services and subscribed to the same types of multimedia services may be grouped together to the form the multicast groups.

Thus, if:

MBMS_Service$_{num}$ (i, num) MBMS_Service$_{num}$ (j, num) AND UE_Servicetype (i, service)==UE_Servicetype (j, service), then the $i^{th}$ UE and the $j^{th}$ UE may be considered as probable candidates for a multicast group.

In some cases, a particular UE may not share a common type of multimedia service or a common number of multimedia services with any other UE. In such cases, the particular UE may form a group by itself.

Once the multicast groups are created based on the types of multimedia services and the number of multimedia services, at least one of a data rate and a resource utilization associated with each group may be determined at step 306. Here, the data rate associated with a multicast group may correspond to the number of data bits consumed by the multicast group per unit time. To determine the data rate of a multicast group, the data rate of each UE associated with a multicast group may be determined. In some embodiments, the data rate associated with a UE may correspond to a summation of individual data rates of multimedia services consumed by the UE. The data rate for the group may be determined as the summation of the data rates for each UE of the group.

The multimedia services subscribed by UEs in a group may utilize different resources, which may be referred to as Resource utilization. For example, Resource Utilization may be bandwidth, memory or power. The summation of resource utilization for individual services for an entire multicast group may be the resource utilization for the multicast group. The summation of the resource utilization for individual services subscribed by a single UE attached to a multicast group may be considered to be the resource utilization for the UE. In some embodiments, the resource utilization for all the UEs may be considered as a resource utilization threshold. This resource utilization threshold may be dynamic. It may change when a UE subscribes or unsubscribes to various multimedia services. In some other embodiments, the resource utilization threshold may be predefined.

On determining the data rate and the resource utilization for each multicast group, the data rate and the resource utilization may be compared with a predefined data rate and the resource utilization threshold respectively. If the data rate and/or the resource utilization of a multicast group exceeds the predefined data rate and the resource utilization threshold respectively, then that multicast group may be discarded from consideration at step 308.

In some embodiments, the UEs in the discarded groups may again be grouped into an already formed multicast group, based on the type of multimedia services the UEs have subscribed to, or the number of services they have subscribed to, or a combination of both similar to step 302 and step 304. For example, if a UE in the discarded group subscribes to a particular on-demand video service, then the UE may be put in a group which was formed by UEs, subscribed to the same on-demand video services. Similarly, a UE which may have subscribed to a particular on-demand video service and the number of services is two, then that UE may be put in the multicast group with similar type and number of services. Also the data rate and resource of utilization of the new multicast groups may have to be compared with the predefined data rate and the resource utilization threshold for the group to check whether the group can be serviced as per step 306 and 308.

In some other embodiments, the discarded groups may be split into two or more smaller multicast groups. If the data rate of the smaller multicast groups and the resource utilization of the smaller multicast groups are less than the predefined data rate and resource utilization threshold of the smaller multicast groups, then the smaller multicast groups may be considered as candidates for multicast of the multimedia services.

Thereafter, at step 310, a number of UEs in each of the multicast groups may be determined. If the number of UEs in a multicast group is less than a predefined UE number threshold, then multimedia services may be multicast to the multicast group at step 312.

In an embodiment, if the number of UEs in a multicast group as determined at step 310 is greater than the predefined UE number threshold, then the multicast group may not be considered for multicasting. Instead, the multimedia services may be broadcast to the group.

During a handover of a UE from the Serving Base Station (SBS) to a neighboring Base Station (BS), information corresponding to the types of multimedia services and the number of multimedia services subscribed by the UE may be transmitted to at least one neighboring base station. In an example, the MSS, may check Hand Over Indication from a Radio Resource Control (RRC) for the UE. The at least one of the at least one type of multimedia services and the number of multimedia services subscribed by the UE may be sent to the at least one neighboring base station by the RRC along with a Hand Over Request. In an example, a Hand Over Request Acknowledgement may be received by the RRC, which may be communicated to the MSS, and the MSS may prepare for transfer of the at least one type of multimedia service. MBMS transfer acknowledgement may be received and the one or more multicast groups may be modified by the MSS.

In an embodiment, the service continuity after handover may be determined by validating the compatibility of new SBS for MBMS service. In an example, data rate of the at least one neighboring base station may be determined. If all the at least one type of multimedia services are running at the at least one neighboring base station, then the data rate may be maintained by the MSS. If the data rate of the at least one neighboring base station is greater than the data rate of the SBS, then a MBMS service handover timer, the predefined data rate and the UE number threshold may be adjusted. For example, the MBMS service handover timer may be used to determine the duration of data throughput at SBS, and whether it falls below a threshold level and the corresponding RSRP falls below a RSRP threshold level. If the duration is above the threshold level, then handover triggering event is determined.

Figure 4:
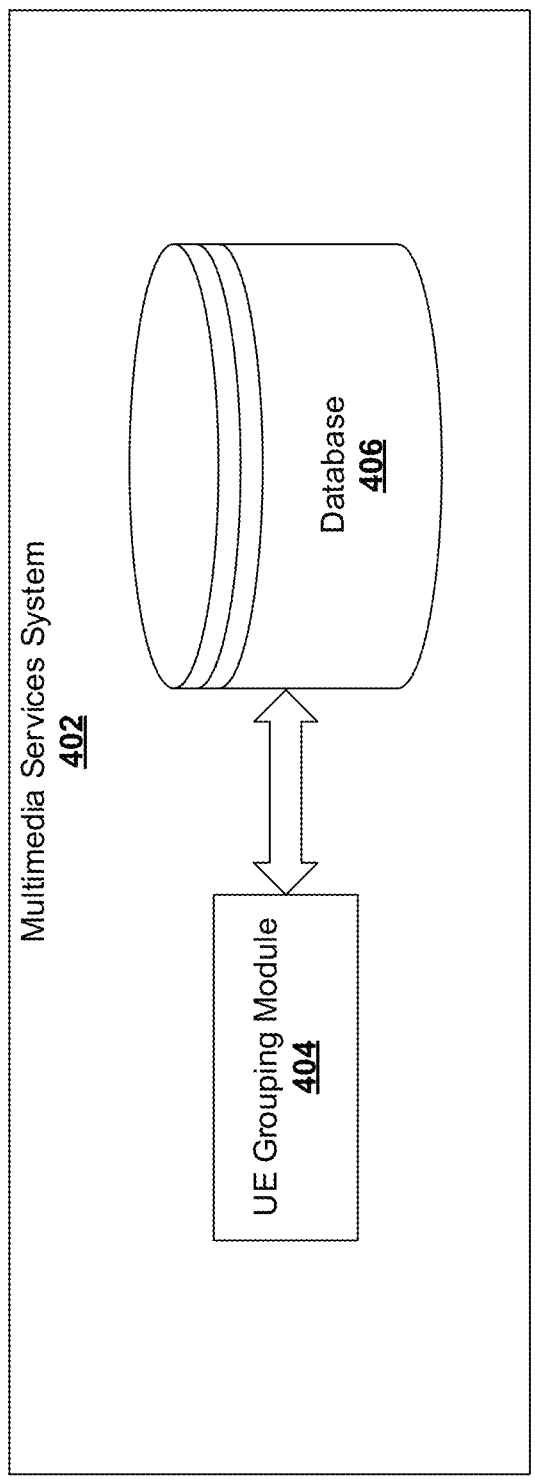
FIG. 4 illustrates an exemplary network environment comprising a Multi Media Services System, in accordance with some embodiments of the present disclosure.

FIG. 4 illustrates an exemplary network environment comprising a Multimedia Services System or computing device 402, in accordance with some embodiments of the present disclosure. Multimedia Services System 402 (hereinafter referred as the MSS 402) may be implemented on variety of computing systems such as a server, a network server, and the like. Although the description herein is with reference to certain computing systems, the systems and methods may be implemented in other computing systems, albeit with a few variations, as will be understood by a person skilled in the art.

As shown in FIG. 4, the MSS 402 comprises a UE Grouping Module 404 and a database 406. In operations, the UE Grouping Module 404 may determine at least one of type of multimedia services and number of multimedia services subscribed by each UE of a plurality of UEs, wherein the at least one type of multimedia services may comprise services such as video conferencing services, real-time content streaming, video-on-demand, etc. In an example, the number of multimedia services may comprise the number of the at least one type of multimedia services subscribed by the each UE.

In an example, the at least one of type of multimedia services and the number of multimedia services subscribed by the each UE may be stored in the database 406. The database 406 may be updated as and when an UE subscribes to new additional multimedia services or unsubscribes from an existing multimedia service.

Upon determining the at least one of type of multimedia services and the number of multimedia services subscribed by the each UE, the UE Grouping Module 404, may create one or more multicast groups, based on the at least one of type of multimedia services and the number of multimedia services subscribed by the each UE. The one or more multicast groups may be created based on a similarity between the at least one of type of multimedia services and the number of multimedia services subscribed by the each UE. Grouping UEs based on the type of multimedia services and the number of multimedia services is explained in detail in conjunction with FIG. 3.

On creating the one or more multicast groups, the UE Grouping Module 404 may determine at least one of a data rate associated with each of the one or more multicast groups and a resource utilization associated with each of the one or more multicast groups. The data rate associated with the each of the one or more multicast groups may be the total data rate, or a summation of data rates associated with each of the at least one of type of multimedia services. The resource utilization of each UE may be determined by the UE Grouping Module 404, which may be the summation of the network resources utilized by each multimedia service subscribed the each UE. The resource utilization of each UE may be the resource utilization threshold.

The UE Grouping Module 404 may then identify the multicast groups having the data rate associated with a group below a predefined data rate and the resource utilization associated with a group below the resource utilization threshold. The identified multicast groups may then be serviced with multimedia services. If the data rate associated with a group is above a predefined data rate and/or the resource utilization associated with a group is higher than the resource utilization threshold, then the group may be discarded by the UE Grouping Module 404. The UEs of the discarded group may then be attached to other multicast groups based on the number of multimedia services or the types of multimedia services by the UE Grouping Module 404. In an example, each individual UE may also form a group depending on the types of services and the number of services subscribed by the group do not match with any of the formed multicast groups. Grouping of UEs from discarded groups is explained in detail in conjunction with FIG. 3.

The UE Grouping Module 404 may further determine a number of UEs in each multicast group. The UE Grouping Module 404 may multicast the multimedia services to a multicast group, if the number of UEs in the multicast group is less than a predefined UE number threshold. In an example, the UE Grouping Module 404 may set the UE number threshold.

In an embodiment, if the number of UEs in each multicast group is higher than the predefined UE number threshold, then multimedia services may be broadcast to the group.

In an embodiment, the MSS 402 may transmit, at least one of the at least one type of multimedia services and the number of multimedia services subscribed by each UE of a plurality of UEs to at least one neighboring base station during a handover as explained in conjunction with FIG. 3.

Figure 5:
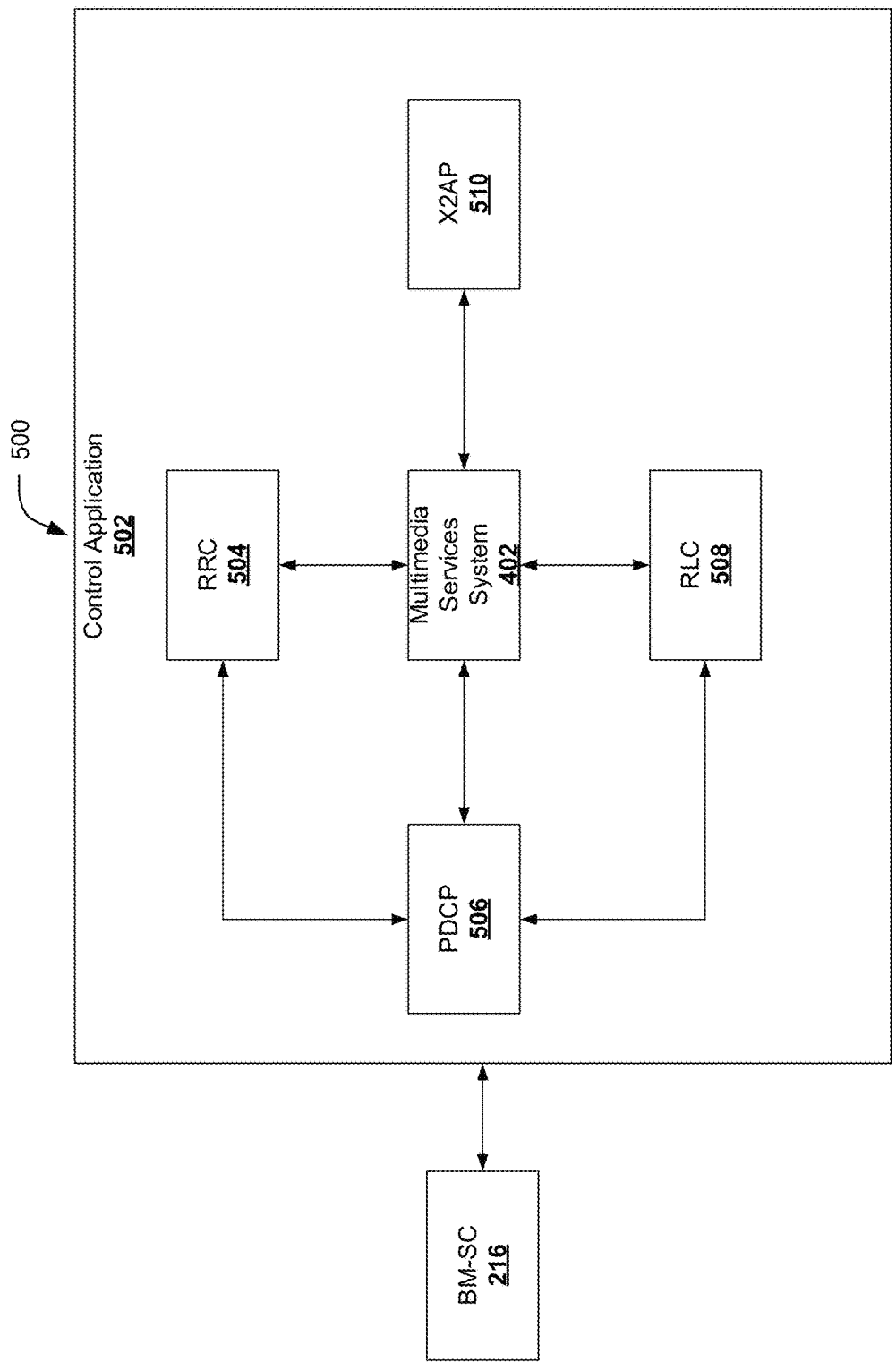
FIG. 5 illustrates an exemplary network environment comprising novel interactions of the Multimedia Services System within a control application.

FIG. 5 illustrates an exemplary network environment 500 comprising novel interactions of the system 402 within a control application 502.

As shown in FIG. 5, during Hand Over decision, the system 402, may receive a request for the at least one type of multimedia service and the number of multimedia services for the each UE from the Radio Resource Control (RRC) 504 synchronously, and the MSS 402 may send the at least one type of multimedia service and the number of multimedia services for the each UE to the RRC 504 synchronously.

In an example during Hand Over preparation, the MSS 402 may receive request from RRC 504, to send the at least one type of multimedia service to the at least one neighboring base station.

In an example, post Hand Over, the RRC 504 may send the transfer information of the at least one type of multimedia service to the MSS 402 asynchronously.

In an example, the MSS 402 may send multimedia service type and the number of multimedia services information to the RLC 508 when it is required to be sent to the each UE., and may receive acknowledgement from the RLC 508.

In an example, the MSS 402 may send multimedia service type and the number of multimedia services information to Packet Data Protocol (PDCP) 506 when it is required to be sent to the each UE in ciphered and compressed mode synchronously.

In an example, the MSS 402, may send request to X2AP 510 when responsibility needs to be transferred to the at least one neighboring base station after handover of the each UE.

Thus, the MSS 402 employs a unique and efficient way of grouping UEs, to optimize bandwidth and resource usage during multimedia data transfer.

Computer System

Figure 6:
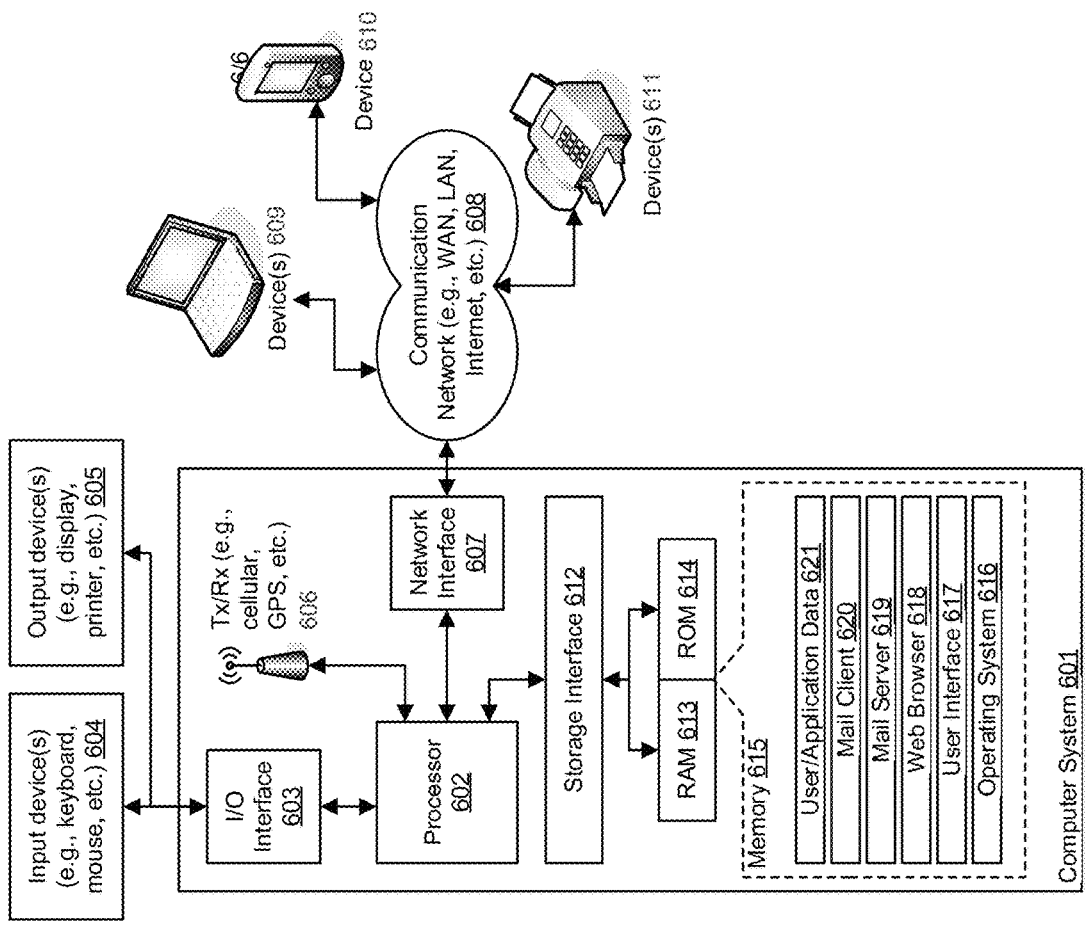
FIG. 6 is a block diagram of an exemplary computer system for implementing embodiments consistent with the present disclosure.

FIG. 6 is a block diagram of an exemplary computer system for implementing embodiments consistent with the present disclosure. Variations of computer system 601 may be used for implementing the system 402 for creating a multicast groups. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc.

The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 408 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method for multimedia broadcast and multicast services. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of creating a multicast group, the method comprising:
   determining, by a multimedia services computing device, a type of multimedia services and a number of multimedia services subscribed by each user equipment (UE) of a plurality of UEs;
   creating, by the multimedia services computing device, one or more multicast groups of UEs based on a similarity between the type of multimedia services and the number of multimedia services subscribed by each of the UEs; and
   discarding, by the multimedia services computing device, at least one multicast group from the one or more multicast groups, wherein at least one of a data rate for the at least one multicast group is higher than a predefined data rate or a resource utilization for the at least one multicast group is higher than a resource utilization threshold; and
   splitting, by the multimedia services computing device, the at least one multicast group that is discarded into a plurality of smaller multicast groups or grouping, by the multimedia services computing device, UEs of the at least one multicast group that is discarded into an existing multicast group based on the type and number of subscriptions of the UEs in the at least one multicast group, wherein the splitting or the grouping is based on a predefined data rate and a resource utilization threshold.

2. The method of claim 1, further comprising:
   identifying, by the multimedia services computing device, the at least one group of the one or more multicast groups having at least one of the data rate below a predefined data rate and the resource utilization below a resource utilization threshold.

3. The method of claim 1, further comprising multicasting, by the multimedia services computing device, the data to each of the at least one group of the one or more multicast groups when the number of the UEs in each of the at least one group of the one or more multicast groups is below a predefined UE number threshold.

4. The method of claim 3 further comprising broadcasting, by the multimedia services computing device, the data to each of the at least one group of the one or more multicast groups when the number of the UEs in each of the at least one group of the one or more multicast groups is above the predefined UE number threshold.

5. The method of claim 1, further comprising sending, by the multimedia services computing device, at least one of the type of multimedia services and the number of multimedia services subscribed by each of the UEs to at least one neighboring base station during a handover.

6. The method of claim 1, further comprising determining a data rate, a resource utilization and a number of the UEs associated with each of the one or more multicast groups, wherein the resource utilization associated with each of the one or more multicast groups indicates a summation of resource utilization for individual services subscribed by the UEs in each of the one or more multicast groups.

7. The method of claim 1, further comprising performing one of multicasting and broadcasting of data to at least one group of the one or more multicast groups based on the data rate, the resource utilization and the number of the UEs associated with each of the one or more multicast groups.

8. The method of claim 1, further comprising grouping, by the multimedia services computing device, UEs associated with the at least one discarded multicast group into one of one or more remaining multicast groups based on type of multimedia services or number of multimedia services subscribed by the UEs.

9. A multimedia services computing device comprising one or more processors and a memory coupled to the one or more processors, the memory comprising programmed instructions stored thereon and the one or more processors configured to execute the stored programmed instructions to:
 determine a type of multimedia services and a number of multimedia services subscribed by each user equipment (UE) of a plurality of UEs;
 create one or more multicast groups of UEs based on a similarity between the type of multimedia services and the number of multimedia services subscribed by each of the UEs; and
 discard at least one multicast group from the one or more multicast groups, wherein at least one of a data rate for the at least one multicast group is higher than a predefined data rate or a resource utilization for the at least one multicast group is higher than a resource utilization threshold; and
 split the at least one multicast group that is discarded into a plurality of smaller multicast groups or group UEs of the at least one multicast group that is discarded into an existing multicast group based on the type and number of subscriptions of the UEs in the at least one multicast group, wherein the splitting or the grouping is based on a predefined data rate and a resource utilization threshold.

10. The multimedia services computing device as set forth in claim 9, wherein the one or more processors are further configured to execute the stored programmed instructions to:
 identify at least one group of the one or more multicast groups having at least one of the data rate below a predefined data rate and the resource utilization below a resource utilization threshold.

11. The multimedia services computing device as set forth in claim 9, wherein the one or more processors are further configured to execute the stored programmed instructions to multicast the data to each of the at least one group of the one or more multicast groups when the number of the UEs in each of the at least one group of the one or more multicast groups is below a predefined UE number threshold.

12. The multimedia services computing device as set forth in claim 9, wherein the one or more processors are further configured to execute the stored programmed instructions to broadcast the data to each of the at least one group of the one or more multicast groups when the number of the UEs in each of the at least one group of the one or more multicast groups is above the predefined UE number threshold.

13. The multimedia services computing device as set forth in claim 9, wherein the one or more processors are further configured to execute the stored programmed instructions to send at least one of the type of multimedia services and the number of multimedia services subscribed by each of the UEs to at least one neighboring base station during a handover.

14. The multimedia services computing device as set forth in claim 9, further comprising determining a data rate, a resource utilization and a number of the UEs associated with each of the one or more multicast groups, wherein the resource utilization associated with each of the one or more multicast groups indicates a summation of resource utilization for individual services subscribed by the UEs in each of the one or more multicast groups.

15. The multimedia services computing device as set forth in claim 9, further comprising performing one of multicasting and broadcasting of data to at least one group of the one or more multicast groups based on the data rate, the resource utilization and the number of the UEs associated with each of the one or more multicast groups.

16. A non-transitory computer readable medium comprising instructions stored thereon for creating a multicast group, which when executed by one or more processors to:
 determine a type of multimedia services and a number of multimedia services subscribed by each user equipment (UE) of a plurality of UEs;
 create one or more multicast groups of UEs based on a similarity between the type of multimedia services and the number of multimedia services subscribed by each of the UEs; and
 discard at least one multicast group from the one or more multicast groups, wherein at least one of a data rate for the at least one multicast group is higher than a predefined data rate or a resource utilization for the at least one multicast group is higher than a resource utilization threshold; and
 split the at least one multicast group that is discarded into a plurality of smaller multicast groups or group UEs of the at least one multicast group that is discarded into an existing multicast group based on the type and number of subscriptions of the UEs in the at least one multicast group, wherein the splitting or the grouping is based on a predefined data rate and a resource utilization threshold.

17. The non-transitory computer readable medium as claimed in claim 16, wherein the instructions, when executed by the one or more processors, further cause the one or more processors to:
 identify at least one group of the one or more multicast groups having at least one of the data rate below a predefined data rate and the resource utilization below a resource utilization threshold.

18. The non-transitory computer readable medium as claimed in claim 16, wherein the instructions, when executed by the one or more processors, further cause the one or more processors to multicast the data to each of the at least one group of the one or more multicast groups when the number of the UEs in each of the at least one group of the one or more multicast groups is below a predefined UE number threshold.

19. The non-transitory computer readable medium as claimed in claim 16, wherein the instructions, when executed by the one or more processors, further cause the one or more processors to broadcast the data to each of the at least one group of the one or more multicast groups when the number of the UEs in each of the at least one group of the one or more multicast groups is above the predefined UE number threshold.

20. The non-transitory computer readable medium as claimed in claim 16, wherein the instructions, when executed by the one or more processors, further cause the one or more processors to send at least one of the at least one type of multimedia services and the number of multimedia services subscribed by each of the UEs to at least one neighboring base station during a handover.

* * * * *